(12) United States Patent
Goto et al.

(10) Patent No.: US 8,601,105 B2
(45) Date of Patent: Dec. 3, 2013

(54) APPARATUS, METHOD AND COMPUTER PROGRAM PRODUCT FOR FACILITATING COMMUNICATION WITH VIRTUAL MACHINE

(75) Inventors: Masataka Goto, Kanagawa (JP); Shinya Murai, Kanagawa (JP); Yasuyuki Nishibayashi, Kanagawa (JP); Mika Minematsu, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/320,212

(22) Filed: Jan. 21, 2009

(65) Prior Publication Data

US 2009/0198809 A1 Aug. 6, 2009

(30) Foreign Application Priority Data

Jan. 31, 2008 (JP) ................. 2008-020925

(51) Int. Cl.
*G06F 15/16* (2006.01)
*G06F 17/21* (2006.01)
*G06F 9/46* (2006.01)

(52) U.S. Cl.
USPC ............... 709/223; 715/723; 718/1; 718/100

(58) Field of Classification Search
USPC ................... 709/223; 715/723; 718/1, 100
See application file for complete search history.

(56) References Cited

U.S. PATENT DOCUMENTS

| 5,506,975 | A | * | 4/1996 | Onodera ........................... 718/1 |
| 6,005,592 | A | | 12/1999 | Koizumi et al. |
| 6,470,376 | B1 | | 10/2002 | Tanaka et al. |
| 6,559,855 | B1 | | 5/2003 | Kawase et al. |
| 6,601,233 | B1 | | 7/2003 | Underwood |
| 6,615,303 | B1 | | 9/2003 | Endo et al. |
| 6,957,186 | B1 | | 10/2005 | Guheen et al. |
| 7,019,788 | B2 | * | 3/2006 | Iizuka et al. ................. 348/584 |
| 7,072,934 | B2 | | 7/2006 | Helgeson et al. |
| 7,130,807 | B1 | | 10/2006 | Mikurak |
| 7,181,679 | B1 | | 2/2007 | Taylor |

(Continued)

FOREIGN PATENT DOCUMENTS

| JP | 10-105367 | 4/1998 |
| JP | 10-200757 | 7/1998 |

(Continued)

OTHER PUBLICATIONS

Retrieved from the Internet, "Suspending and Resuming Virtual Machines", http://www.umware.com/support/esx2/doc/esx20admin_remote-console8.html # 1004281.

(Continued)

*Primary Examiner* — Alina N. Boutah
(74) *Attorney, Agent, or Firm* — Nixon & Vanderhye, P.C.

(57) ABSTRACT

A communication device includes a receiving unit that receives, from a computer running a virtual machine that can be switched between an active state and a stopped state, screen information provided by the virtual machine; a display unit that displays the screen information; a judging unit that, from the screen information displayed by the display unit, based on a number of operation procedures required for a process to be performed, judges whether the virtual machine performing the process by the operation procedures is to be stopped; and a transmitting unit that transmits a signal to the computer running the virtual machine judged to be stopped for stopping the virtual machine.

20 Claims, 7 Drawing Sheets

(56) References Cited

U.S. PATENT DOCUMENTS

| | | | |
|---|---|---|---|
| 7,272,799 B2* | 9/2007 | Imada et al. | 715/767 |
| 7,368,918 B2 | 5/2008 | Henson et al. | |
| 7,380,206 B1* | 5/2008 | Usuda | 715/236 |
| 7,380,236 B2 | 5/2008 | Hawley | |
| 7,418,584 B1 | 8/2008 | Klaiber et al. | |
| 7,457,656 B2 | 11/2008 | Judd et al. | |
| 7,506,265 B1* | 3/2009 | Traut et al. | 715/763 |
| 7,577,722 B1* | 8/2009 | Khandekar et al. | 709/220 |
| 7,610,546 B1* | 10/2009 | Nagao et al. | 715/203 |
| 7,634,681 B2* | 12/2009 | Takamoto et al. | 714/4.1 |
| 7,680,919 B2* | 3/2010 | Nelson | 709/223 |
| 7,720,672 B1* | 5/2010 | Buswell et al. | 703/27 |
| 8,045,828 B2 | 10/2011 | Goto et al. | |
| 8,146,098 B2* | 3/2012 | Fitzgerald et al. | 719/316 |
| 8,209,408 B1* | 6/2012 | Huang et al. | 709/223 |
| 2003/0001853 A1 | 1/2003 | Obayashi | |
| 2005/0108440 A1 | 5/2005 | Baumberger et al. | |
| 2005/0132364 A1* | 6/2005 | Tewari et al. | 718/1 |
| 2006/0005189 A1* | 1/2006 | Vega et al. | 718/1 |
| 2006/0092466 A1* | 5/2006 | Ikeda | 358/1.15 |
| 2006/0187217 A1* | 8/2006 | Son et al. | 345/204 |
| 2006/0279578 A1 | 12/2006 | Karlov | |
| 2007/0067739 A1* | 3/2007 | Atarashi et al. | 715/818 |
| 2007/0271560 A1* | 11/2007 | Wahlert et al. | 718/1 |
| 2007/0300220 A1* | 12/2007 | Seliger et al. | 718/1 |
| 2007/0300221 A1* | 12/2007 | Hartz et al. | 718/1 |
| 2008/0104608 A1* | 5/2008 | Hyser et al. | 718/105 |
| 2008/0229227 A1* | 9/2008 | Bantz et al. | 715/771 |
| 2008/0235361 A1* | 9/2008 | Crosbie et al. | 709/223 |
| 2008/0244577 A1* | 10/2008 | Le et al. | 718/1 |
| 2008/0244579 A1* | 10/2008 | Muller | 718/100 |
| 2008/0301673 A1* | 12/2008 | Kawasaki et al. | 718/1 |
| 2009/0016566 A1 | 1/2009 | Goto et al. | |
| 2009/0070781 A1* | 3/2009 | Fitzgerald et al. | 719/316 |
| 2009/0077361 A1* | 3/2009 | Neiger et al. | 712/241 |
| 2009/0112972 A1* | 4/2009 | Liu | 709/203 |
| 2009/0147014 A1 | 6/2009 | Minematsu et al. | |
| 2009/0193414 A1* | 7/2009 | Broussard et al. | 718/1 |
| 2009/0198809 A1 | 8/2009 | Goto et al. | |
| 2009/0300605 A1* | 12/2009 | Edwards et al. | 718/1 |
| 2010/0088699 A1* | 4/2010 | Sasaki | 718/1 |
| 2010/0186012 A1* | 7/2010 | Imada et al. | 718/1 |

FOREIGN PATENT DOCUMENTS

| | | |
|---|---|---|
| JP | 10-307731 | 11/1998 |
| JP | 11-331610 | 11/1999 |
| JP | 2000-330806 | 11/2000 |
| JP | 2001-067289 | 3/2001 |
| JP | 2003-084751 | 3/2003 |
| JP | 2003085135 A | 3/2003 |
| JP | 2004-086550 | 3/2004 |
| JP | 2007-025073 | 2/2007 |
| JP | 2007-233815 | 9/2007 |

OTHER PUBLICATIONS

U.S. Appl. No. 12/073,841.
U.S. Appl. No. 12/314,244.
Minematsu et al., U.S. Appl. No. 12/314,244, filed Dec. 5, 2008.
Goto et al., U.S. Appl. No. 12/073,841, filed Mar. 11, 2008.
Lin Tan et al.; "iKERNEL: Isolating Buggy and Malicious Device Drivers Using Hardware Virtualization Support"; Third IEEE International Symposium on Dependable, Autonomic and Secure Computing; IEEE Computer Society 2007; pp. 134-142.
Anonymous; "Double Buffering and Page Flipping"; Internet Article May 9, 2001, pp. 1-3; XP-002516561; URL: http://web.archive.org/web/20010509192614/http://java.sun.com/docs/books/tutorial/extra/fullscreen/doublebuf.html; retrieved Feb. 23, 2009; pp. 2-3.
Adams K.; "Graphics and I/O Virtulization"; Internet Article Dec. 16, 2005, pp. 1-2; XP002516562; URL:http//www.x86vmm.blogspot.com/2005/12/graphics-and-io-virtulization.html ; retrieved Feb. 20, 2009; p. 1.
"What is Xen", [Online], http://xen.org/, retrieved Aug. 1, 2008.
"Virtualization via Hypervisor, Virtual Machine & Server Consolidation", [Online], http://www.vmware.com/ , retrieved Aug. 1, 2008.
Xen, QEMU VNC Display Driver, http://lxr.xensource.com/lxr/source/tools/ioemu/vnc.c , 2006.
Office Action dated Jan. 24, 2012 in JP Application No. 2008-020925 with English-language translation.
ESX Server 2.1 Administration Guide, VMware, Inc., Jun. 20, 2004, URL.

* cited by examiner

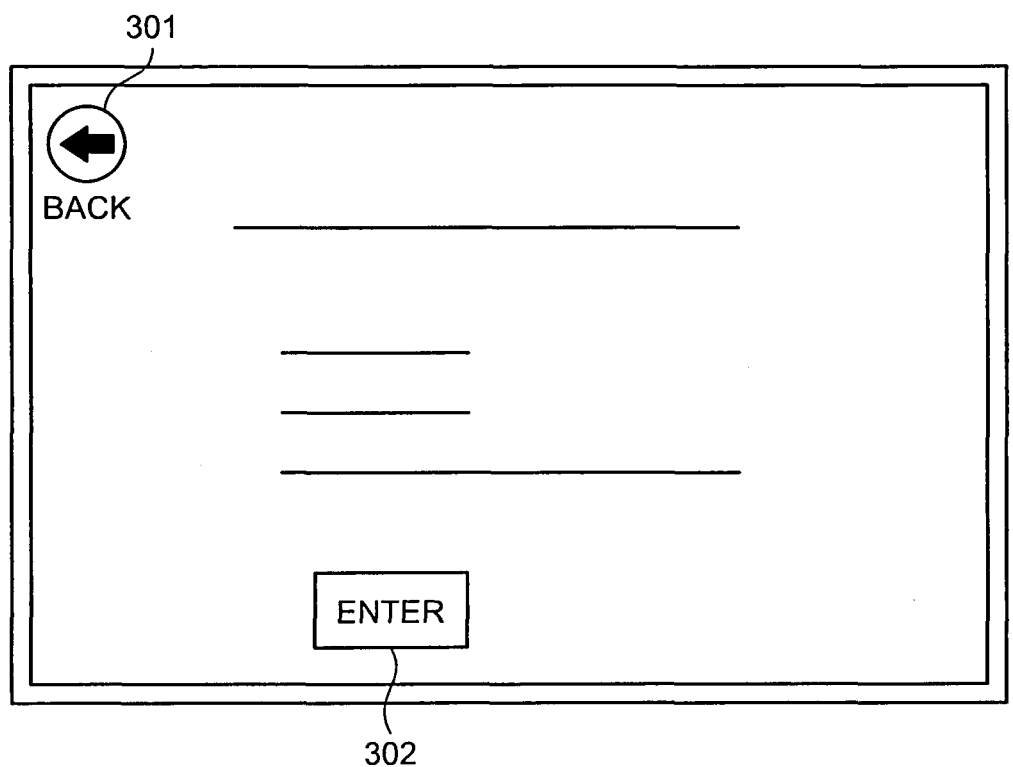

| VM | DISPLAY STATE | STATUS |
|---|---|---|
| VM2 | — | STOPPED |
| VM3 | "BACK" | ACTIVE |
| VM4 | DISPLAYING | ACTIVE |
| | | |

| VM | DISPLAY STATE | STATUS |
|---|---|---|
| VM2 | TAB HIDDEN | STOPPED |
| VM3 | DISPLAYING | ACTIVE |
| VM4 | TAB DISPLAYED | ACTIVE |
|  |  |  |

FIG.12
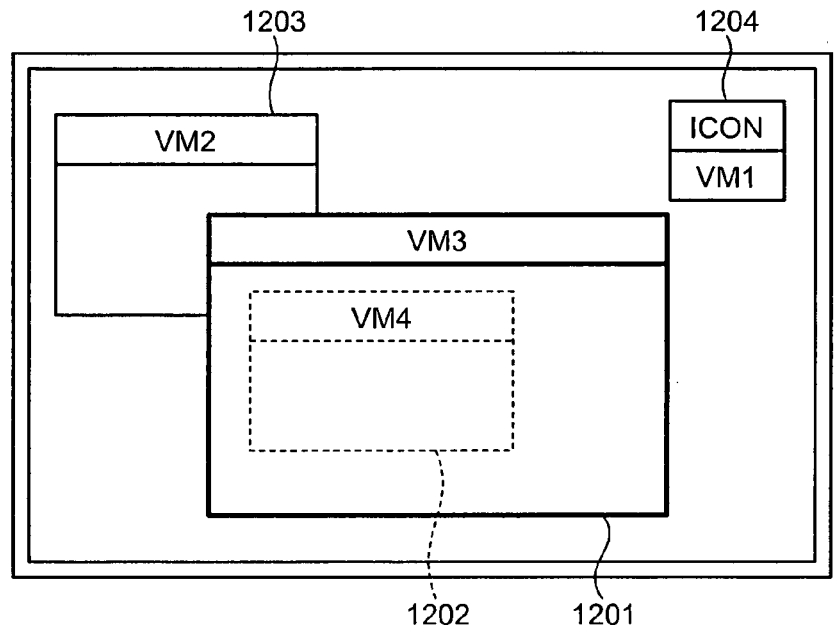
FIG.13
| VM | DISPLAY STATE | STATUS |
|---|---|---|
| VM1 | ICON-CREATED | SUSPENDED |
| VM2 | DISPLAYING | ACTIVE |
| VM3 | DISPLAYING (FOCUSED) | ACTIVE |
| VM4 | NOT DISPLAYED | STOPPED |
FIG.14
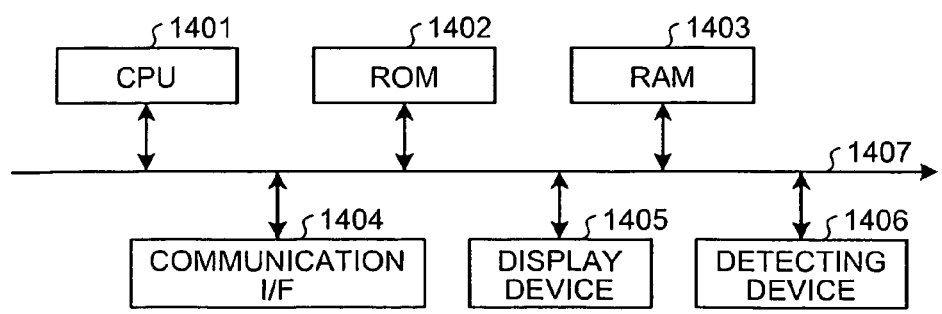

APPARATUS, METHOD AND COMPUTER PROGRAM PRODUCT FOR FACILITATING COMMUNICATION WITH VIRTUAL MACHINE

CROSS-REFERENCE TO RELATED APPLICATIONS

This application is based upon and claims the benefit of priority from the prior Japanese Patent Application No. 2008-20925, filed on Jan. 31, 2008; the entire contents of which are incorporated herein by reference.

BACKGROUND OF THE INVENTION

1. Field of the Invention

The present invention relates to a communication device, a method, and a computer program product. The communication device transmits information to and receives information from a computer running a virtual machine.

2. Description of the Related Art

Conventional technology allows a communication device, which is connected to a calculating device via a network, to display screen data displayed on the calculating device. The technology allows processes performed by the calculating device to be controlled.

A following system is realized through the use of the above-described technology. A user carries a communication terminal device having only a minimal input and output interface, such as a liquid crystal touch-panel and a pen. The communication terminal device connects over a network to a server (calculating device) present at a remote location. The communication terminal device uses a service provided by the server.

In recent years, a technology has been proposed to make a plurality of virtual machines run on a server. A virtual machine allows a physical computer to run a plurality of virtual computers, mainly through use of software, and allows the virtual computers to run operating systems and application programs. As a result, a system conventionally operated by many computers can be implemented by fewer computers.

When a virtual machine technology is applied to the above-described system, a server that is a connection destination of the communication terminal device is transferred, for example, from a virtual machine server A to a virtual machine server B, according to user operation.

When a system using the virtual machines such as that above is run, it is preferable to make the server which operates the virtual machines stop a virtual machine not currently used by, for example, the communication terminal device as long as possible because such operation directly leads to improvement in service scalability.

On the other hand, when the communication terminal device resumes use of a service provided by a virtual machine that has been stopped, the user is required to wait while the virtual machine is being restarted. Therefore, when the virtual machine provides a service, a judgment regarding when to stop operation of the virtual machine is required to be carefully made.

In an online article entitled "Suspending and Resuming Virtual Machines", a technology is proposed that allows stopping and starting of a virtual machine to be changed depending on a user. According to this technology, the user can change when to stop and start the virtual machine Therefore, the user can control the virtual machine so as to make the virtual machine stop after the use and make the virtual machine start in advance when the user wishes to use the virtual machine.

However, though the technology described in "Suspending and Resuming Virtual Machines" allows the user to indicate when to stop the virtual machine, it is not easy for the user to appropriately determine whether to stop the virtual machine or not.

SUMMARY OF THE INVENTION

According to one aspect of the present invention, a communication device includes a receiving unit that receives, from a computer running a virtual machine that can be switched between an active state and a stopped state, screen information provided by the virtual machine, a display unit that displays the screen information, a judging unit that, from the screen information displayed by the display unit, based on a number of operation procedures required for a process to be performed, judges whether the virtual machine performing the process by the operation procedures is to be stopped, and a transmitting unit that transmits a signal to the computer running the virtual machine judged to be stopped for stopping the virtual machine.

According to another aspect of the present invention, a communication method includes receiving, from a computer running a virtual machine that can be switched between an active state and a stopped state, screen information provided by the virtual machine, displaying the screen information, judging, from the screen information displayed in the displaying, based on a number of operation procedures required for a process to be performed, whether the virtual machine performing the process by the operation procedures is to be stopped, and transmitting a signal to the computer running the virtual machine judged to be stopped for stopping the virtual machine.

A computer program product according to still another aspect of the present invention causes a computer to perform the method according to the present invention.

BRIEF DESCRIPTION OF THE DRAWINGS

FIG. 3 is a diagram of a first example of a screen displayed in a display unit of the user monitor terminal according to the first embodiment;

FIG. 4 is a diagram of a table structure of a status storing unit according to the first embodiment;

FIG. 12 is a diagram of an example of a screen displayed in a display unit of the user monitor terminal according to the third embodiment;

FIG. 13 is a diagram of a table structure of a status storing unit according to the third embodiment; and FIG. 14 is a diagram of a hardware configuration of a user monitor terminal.

DETAILED DESCRIPTION OF THE PREFERRED EMBODIMENTS

Exemplary embodiments of the present invention are described below with reference to the attached drawings. A communication device, a method, and a computer program product of the present invention can be applied to various devices in addition to a user monitor terminal.

Figure 1:
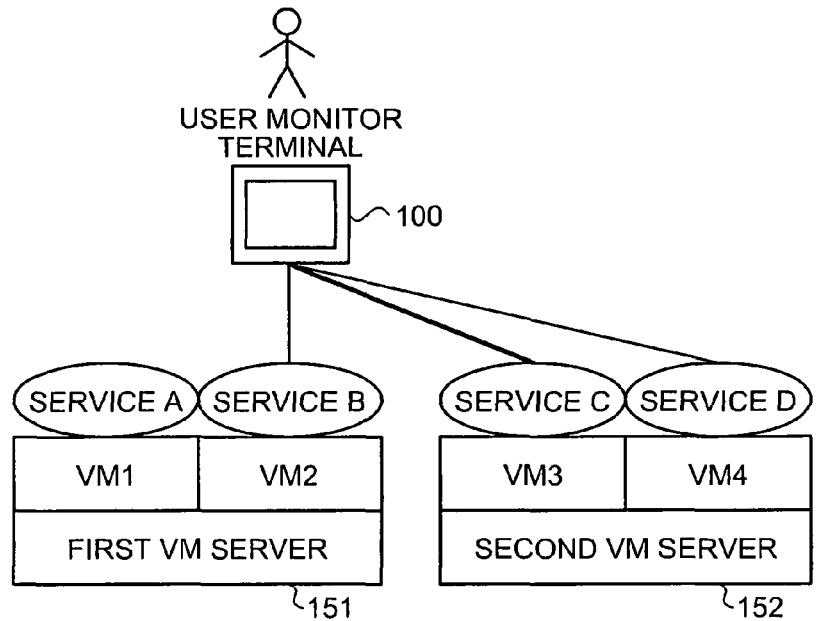
FIG. 1 is a schematic diagram of a system configuration including Virtual Machine servers according to a first embodiment.

As shown in FIG. 1, a user monitor terminal 100, operated by a user, is connected to a virtual machine (VM) server by a network. The VM server operates VM. The user monitor terminal 100 receives a service from a VM running on the VM server by transmitting data to and receiving data from the VM server.

The user monitor terminal 100 according to a first embodiment provides a display function for displaying information on a liquid crystal touch-panel and a pen inputting function for performing a pen-input operation on the liquid crystal touch-panel.

A first VM server 151 and a second VM server 152, shown in FIG. 1, are personal computer (PC) servers that run the VM. Through a virtualization technology, a VM 1 and a VM 2 are generated in the first VM server 151, and a VM 3 and a VM 4 are generated in the second VM server 152. A service A, a service B, a service C, and a service D are application programs for user-oriented services respectively run on the VM 1, the VM 2, the VM 3, and the VM 4.

When the user operates the user monitor terminal 100, the user monitor terminal 100 connects to a VM running on a certain VM server (the first VM server 151 or the second VM server 152). The user references a desktop screen provided by the VM and performs a pen-input operation on the desktop screen. The user monitor terminal 100 transmits pen-input information entered through the pen-input operation to the VM. Subsequently, the VM transmits information corresponding to a result of the pen-input operation to the user monitor terminal 100. As a result, a service by the VM can be used on the user monitor terminal 100.

In FIG. 1, the user monitor terminal 100 is connected to the VM 3 of the second VM server 152 and displays a desktop screen of the VM 3. The user monitor terminal 100 uses a service C provided by the VM 3. Moreover, the user monitor terminal 100 is connected to the VM 2 of the first VM server 151 and the VM 4 of the second VM server 152, or is capable of immediately connecting to the VM 2 and the VM 4 in response to a user operation as a trigger. Whether the user monitor terminal 100 is "connected" to the VM 2 and the VM 4, or is "capable of immediately connecting" to the VM 2 and the VM 4 is dependent on a design of a graphical user interface (GUI) displayed on the user monitor terminal 100. Specific screens that are displayed will be described later.

In FIG. 1, the user monitor terminal 100 is neither currently connected to the VM 1 of the first VM server 1 nor capable of immediately connecting to the VM 1 in response to a user operation as the trigger.

In an example according to the first embodiment, a VM that is connected or can be immediately connected to the user monitor terminal 100 (the VM 2, the VM 3, and the VM 4 in the above-described example) is in an active state. A VM that is neither currently connected nor capable of immediately connecting to the user monitor terminal 100 in response to a user operation as the trigger is in a suspended state. Moreover, even when a VM can be connected to the user monitor terminal 100, the VM switches between the active state and the suspended state based on circumstances, according to screen data being displayed.

Figure 2:
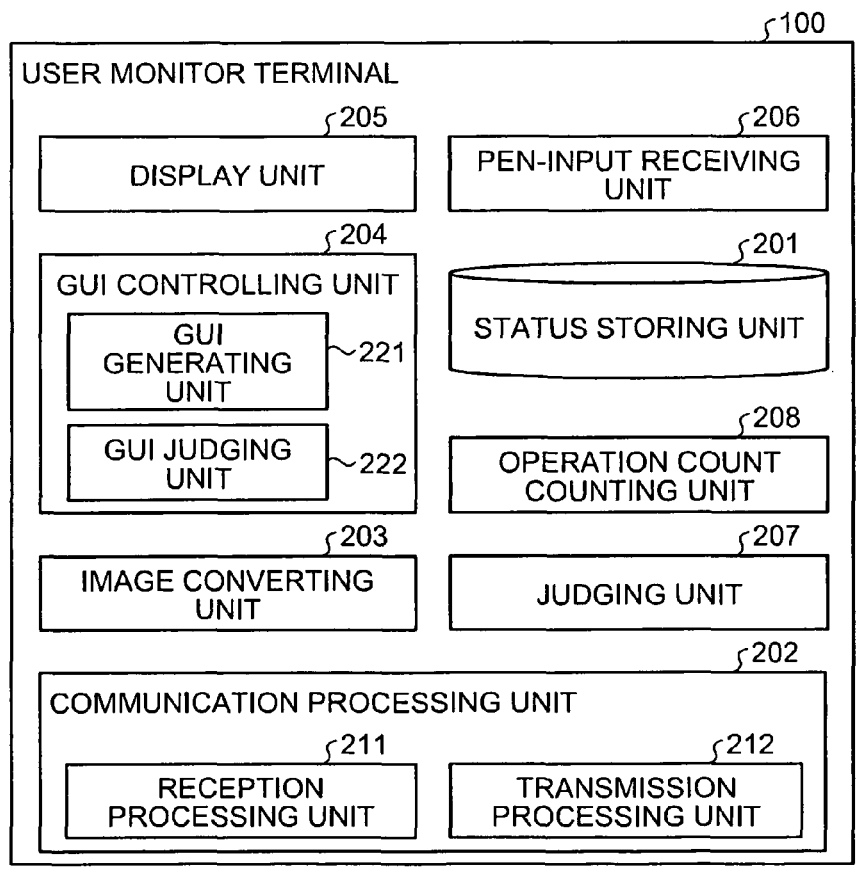
FIG. 2 is a block diagram of a configuration of a user monitor terminal according to the first embodiment.

As shown in FIG. 2, the user monitor terminal 100 includes a status storing unit 201, a communication processing unit 202, an image converting unit 203, a GUI controlling unit 204, a display unit 205, a pen-input receiving unit 206, a judging unit 207, and an operation count counting unit 208.

The pen-input receiving unit 206 receives input performed on the liquid crystal touch-panel (not shown) of the user monitor terminal 100 as the pen-input information (e.g., positional coordinates indicated using a pen).

The communication processing unit 202 includes a reception processing unit 211 and a transmission processing unit 212. The communication processing unit 202 connects with a VM server running a VM and transmits and receives information. The communication processing unit 202 also performs processes for establishing connection with the VM, breaking the connection with the VM, and the like.

The reception processing unit 211 receives screen data of a desktop of the VM to which the user monitor terminal 100 is connected and the like from the VM server running the VM.

The transmission processing unit 212 transmits the pen-input information and VM switching information to the VM to which the user monitor terminal 100 is connected. Moreover, the transmission processing unit 212 also transmits a signal for stopping the VM, a signal for transitioning the VM to the suspended state, and a signal for transitioning the VM to the active state to the VM server running the VM.

The image converting unit 203 decodes the screen data of the desktop of the VM received from the reception processing unit 211, and converts the decoded screen data into an image data format that can be displayed in the user monitor terminal 100. For example, when the received screen data is compressed in an image format such as Joint Photographic Experts Group (JPEG) and Portable Network Graphics (PNG), the image converting unit 203 decodes the screen data and converts the decoded screen data to red, green, and blue (RGB) data. The image converting unit 203 then outputs the screen data of which a display format has been converted to the GUI controlling unit 204.

The GUI controlling unit 204 includes a GUI generating unit 221 and a GUI judging unit 222. The GUI controlling unit 204 performs display control of switch-display data and input receiving control of the switch-display data. The switch-display data is displayed to switch the VM providing the screen data. The switch-display data is used to switch a screen displayed in the display unit 205.

The GUI controlling unit 204 also updates the status storing unit 201.

The GUI generating unit 221 generates the switch-display data. The GUI generating unit 221 also generates switch-display-added screen data by combining the generated switch-display data and the received screen data. When a pen-input performed on the switch-display data is received, the currently displayed screen data is switched to screen data provided by another VM. The switch-display-added screen data is the screen data provided by the VM to which the switch-display data has been added.

In the first embodiment, a "page switching method" is used as a GUI method for the switch-display-added screen data.

Specifically, when the pen-input performed on the switch-display data is received, the screen data is switched in a manner similar to turning a page.

The GUI judging unit 222 judges whether positional coordinates indicated by the pen-input information received by the pen-input receiving unit 206 indicate the switch-display data. When the GUI judging unit 222 judges that the positional coordinates indicate the switch-display data, the GUI judging unit 222 judges that an instruction to switch the VM has been given. When the GUI judging unit 222 judges that the instruction to switch the VM has been given, the transmission processing unit 212 transmits a notification for switching the VM.

The display unit 205 displays the switch-display-added screen data combined by the GUI generating unit 221. In a screen example shown in FIG. 3, a "back" button indicated by a reference number 301 serves as switch-display data used to switch the VM. When the user clicks on the "back" button 301 with the pen, the display unit 205 displays screen data provided by a VM immediately before another VM provides the screen data currently displayed. Other pieces of switch-display data are a "forward" button and the like.

When the user presses an "enter" button 302, the pen-input information including the positional coordinates is sent to the VM transmitting the screen data. As a result, the user monitor terminal 100 performs processes such as receiving a service provided by the VM and switching a connection destination of the VM.

The status storing unit 201 stores status of the VM to which the user monitor terminal 100 has been connected. As shown in FIG. 4, a "VM" to which the user monitor terminal 100 has been connected, a "display state", and a "status" are stored in association with one another. A "VM" field stores therein identifying information of the VM to which the user monitor terminal 100 has been connected. A "display state" field holds therein a display state of the VM. For example, when the "display state" field is set to "displaying", the screen data provided by the VM associated with "displaying" is currently being displayed. When the "display state" field is set to "back", the screen data provided by the VM associated with "back" is displayed when the user presses the "back" button. When the "display state" field is set to "forward", the screen data provided by the VM associated with "forward" is displayed when the user presses the "forward" button.

In other words, the status storing unit 201 shown in FIG. 4 indicates that screen data provided by the VM 3 is displayed on the user monitor terminal 100. Although the VM 2 and the VM 4 are connected to the user monitor terminal 100, screen data provided by the VM 2 and the VM 4 are not displayed.

A "status" field indicates a state of the VM. The "status" field stores therein information on a state, among three types of states: "active", "stopped", and "suspended". When the "status" field is set to "active", the VM is in an active state. When the "status" field is set to "stopped", the VM is in a stopped state. When the "status" field is set to "suspended", the VM is in a suspended state.

According to the first embodiment, a VM maintaining the active state provides the screen data that is being displayed or screen data that can be displayed by a single click of the "forward" button or the "back" button. In other words, a VM that can be operated by a single user operation or less is kept in the active state.

In the stopped state, although a central processing unit (CPU) in the VM server is not allocated to the VM, information required to start the VM is stored within a memory of the VM server. Therefore, the VM can quickly return to the active state. In the suspended state, the CPU of the VM server is not allocated to the VM, and the information required to start the VM is removed from the memory and saved in a hard disk drive (HDD). Therefore, time is required for the VM to return to the active state.

According to the first embodiment, the VM is placed in the stopped state if the screen data of the VM is displayed by the user pressing the "forward" button or the "back" button twice or more. In other words, a VM that can be operated by two or more user operations is kept in the stopped state.

According to the first embodiment, the VM is placed in the suspended state if the screen data of the VM is not displayed regardless of a number of times the user presses the "forward" button or the "back" button.

Every time the user operates the user monitor terminal 100 and the user monitor terminal 100 connects to a new VM, the GUI controlling unit 204 adds an entry for the new VM in the status storing unit 201 shown in FIG. 4.

The status storing unit 201 in FIG. 4 indicates that the user monitor terminal 100 has been sequentially connected to the VM 2, the VM 3, and the VM 4. The GUI controlling unit 204 sets the "display state" field of an entry for "VM 4" to "displaying" immediately after the user monitor terminal 100 is connected to the VM 4. When the user presses the "back" button, the GUI controlling unit 204 updates the "display state" field of an entry for "VM 2" to "back", the "display state" field of an entry for "VM 3" to "displaying", and the "display state" field of the entry for "VM 4" to "forward". With the update, the judging unit 207, described later, judges that the screen data of the VM 2, the VM 3, and the VM 4 can be displayed by a single operation or less, and updates the "status" field of each entry to "active".

In the status storing unit 201 in FIG. 4, an entry for the VM 1 is not present. The entry for the VM 1 may have been deleted after the user monitor terminal 100 had been connected to the VM 1, or the user monitor terminal 100 may have never been connected to the VM 1.

Figures 5, 6:
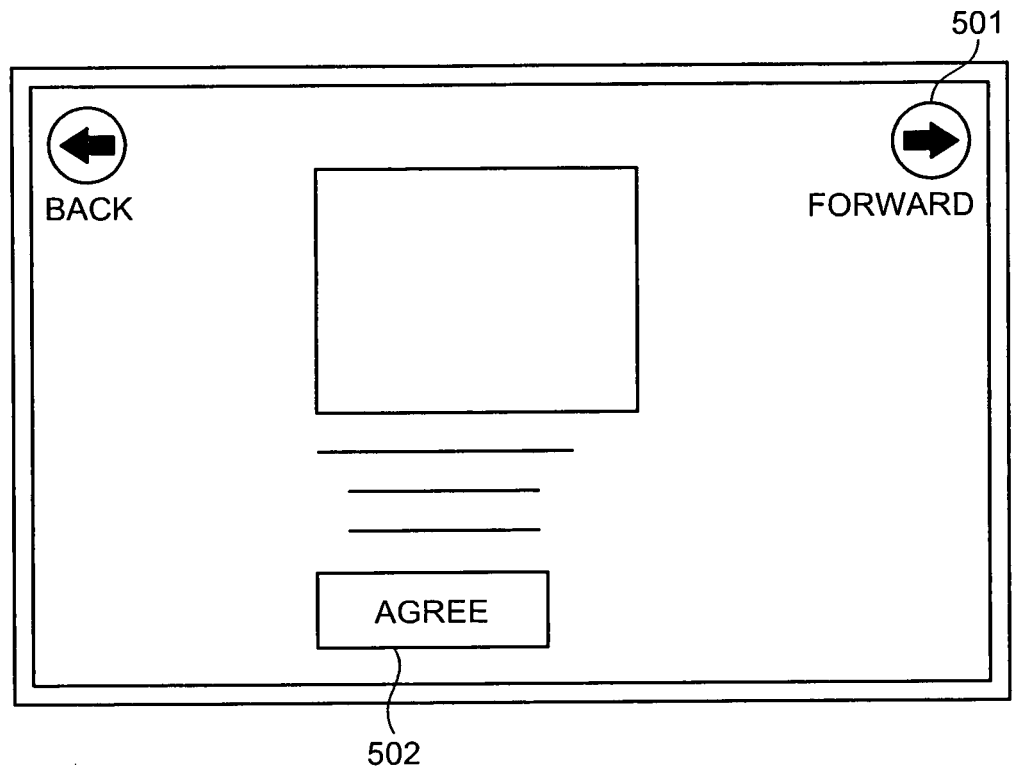
FIG. 5 is a diagram of a second example of a screen displayed in the display unit of the user monitor terminal according to the first embodiment.
FIG. 6 is a diagram of the status storing unit of the first embodiment where screen data of VM 4 is set to "displaying"

Subsequently, the GUI generating unit 221 generates the switch-display-added screen data that is a combination of the screen data received from the VM 3 and the switch-display data. The display unit 205 displays the switch-display-added screen data including the screen data provided by the VM 3 as shown in FIG. 5. In the switch-display-added screen data in FIG. 5, a "forward" button 501 used to switch to the screen data provided by the VM 4 is displayed. When the user presses the "forward" button 501 or an "agree" button 502, the display unit 205 displays the switch-display-added screen data including the screen data provided by the VM 4.

The operation count counting unit 208 counts the number of operation procedures required to perform a process from the switch-display-added screen data displayed in the display unit 205 for each VM, based on each entry stored in the status storing unit 201. The operation count counting unit 208 according to the first embodiment can count the number of operation procedures (i.e., operation count) required for each VM from an order of registration of the entries in the status storing unit 201. For example, the operation count of entries before and after an entry where the "display state" field is set to "displaying" (in other words, entries where the "display state" field is set to "back" or "forward") is one. In other words, an entry of the "display state" where "back" or "forward" is set is an entry of a VM that may perform a process by a single user operation.

The judging unit 207 judges whether to stop the VM based on the number of operation procedures counted by the operation count counting unit 208 for each VM. According to the first embodiment, a basis for judgment is whether the number of operation procedures is one operation or less. However, according to the first embodiment, the basis for judgment is not limited to whether the number of operation procedures is one operation or less. An appropriate number of operations can be set based on usage conditions.

The judging unit 207 according to the first embodiment judges that a VM which performs a process that cannot be called unless the user presses the "forward" button or the "back" button twice or more from the switch-display-added screen data is to be placed in the stopped state. The judging unit 207 also judges that a VM which performs a process that cannot be called no matter what kind of operations is performed on the switch-display-added screen data is to be placed in the suspended state.

In other words, when the "display state" field of the VM in the status storing unit 201 is set to "back", "displaying", or "forward", the number of operation procedures counted by the operation count counting unit 208 is one operation or less. Therefore, the judging unit 207 judges that the VM is placed in the active state. When the "display state" field of the VM is not set to "back", "displaying", or "forward", the number of operation procedures counted by the operation count counting unit 208 is two operations or more. Therefore, the judging unit 207 judges that the VM is placed in the stopped state.

In other words, with reference to the status storing unit 201 in FIG. 4, the judging unit 207 judges that the VM 2, the VM 3, and the VM 4 are required to be placed in the active state. The judging unit 207 updates the "status" field of all entries to "active". Then, the transmission processing unit 212 transmits signals to place the VM 2, the VM 3, and the VM 4 in the active state.

Subsequently, when the VM providing the screen data is switched from the VM 3 to the VM 4 as a result of the user pressing the "forward" button once or the like, as shown in FIG. 6, the GUI controlling unit 204 updates the "display state" field of the entry for the "VM 2" to "-", the "display state" field of the entry for the "VM 3" to "back", and the "display state" field of the entry for the "VM 4" to "displaying". In other words, the screen data provided by the VM 2 is displayed when the user presses the "back" button twice.

Then, when the operation count counting unit 208 counts the number of operation procedures for each entry, the judging unit 207 judges that the VM3 and the VM 4 are kept in the active state and the VM 2 is placed in the stopped state, based on counting results. Then, as shown in FIG. 6, the judging unit 207 updates the "status" field of the entry for the "VM 2" to "stopped".

When the judging unit 207 judges that a VM is to be placed in the stopped state or the suspended state, the transmission processing unit 212 transmits a signal to the VM server that runs the VM for placing the VM in the stopped state or the suspended state. When the judging unit 207 judges that a VM that is in the stopped state is to be placed in the active state, the transmission processing unit 212 transmits a signal to the VM server that runs the VM for placing the VM in the active state.

The VM server receiving these signals performs a following process. First, when the VM server receives the signal to place the VM in the active state, the VM server starts operating the VM. Specifically, the VM server schedules allocation of operation resources, such as the CPU.

When the VM server receives the signal to place the VM in the stopped state, the VM server stops running the VM. Specifically, the VM server excludes the pertinent VM from the schedule of the allocation of operation resources, such as the CPU.

When the VM server receives the signal to place the VM in the suspended state, the VM server withdraws an operation image of the VM to storage. Specifically, the VM server removes pieces of data indicating an operating state of the VM, such as a memory image of the VM and virtual device status information, from a memory and stores the pieces of data in a storage component, such as a hard disk.

A VM outputting screen data that is inaccessible unless the user presses the "forward" button or the "back" button twice or more is unlikely to be run immediately. Therefore, as a result of the transmission processing unit 212 according to the first embodiment transmitting the signal for placing the VM in the stopped state, processing load placed on the VM server running the VM can be reduced. Moreover, a VM that cannot be called regardless of the user operations performed from the switch-display-added screen data is unlikely to be called. Therefore, the transmission processing unit 212 transmits the signal to place the VM in the suspended state. The VM server running the VM releases resources used by the VM.

Moreover, when the user presses the "forward" button or the "back" button and the screen data being displayed is switched, when a VM is present that can be called by the user pressing the "forward" button or the "back" button one more time, the transmission processing unit 212 transmits the signal for placing the VM in the active state to the VM server running the VM.

As a result of the above-described process performed by the user monitor terminal 100, the VM that may possibly be used immediately is placed in the active state. The VM that is unlikely to be used immediately is placed in the stopped state or the suspended state. As a result, when the VM is switched according to the user operation, service can be provided immediately because the VM is in the active state. Because the VM that will not be used immediately is placed in the stopped state, the processing load placed on the VM server running the VM can be reduced.

Figure 7:
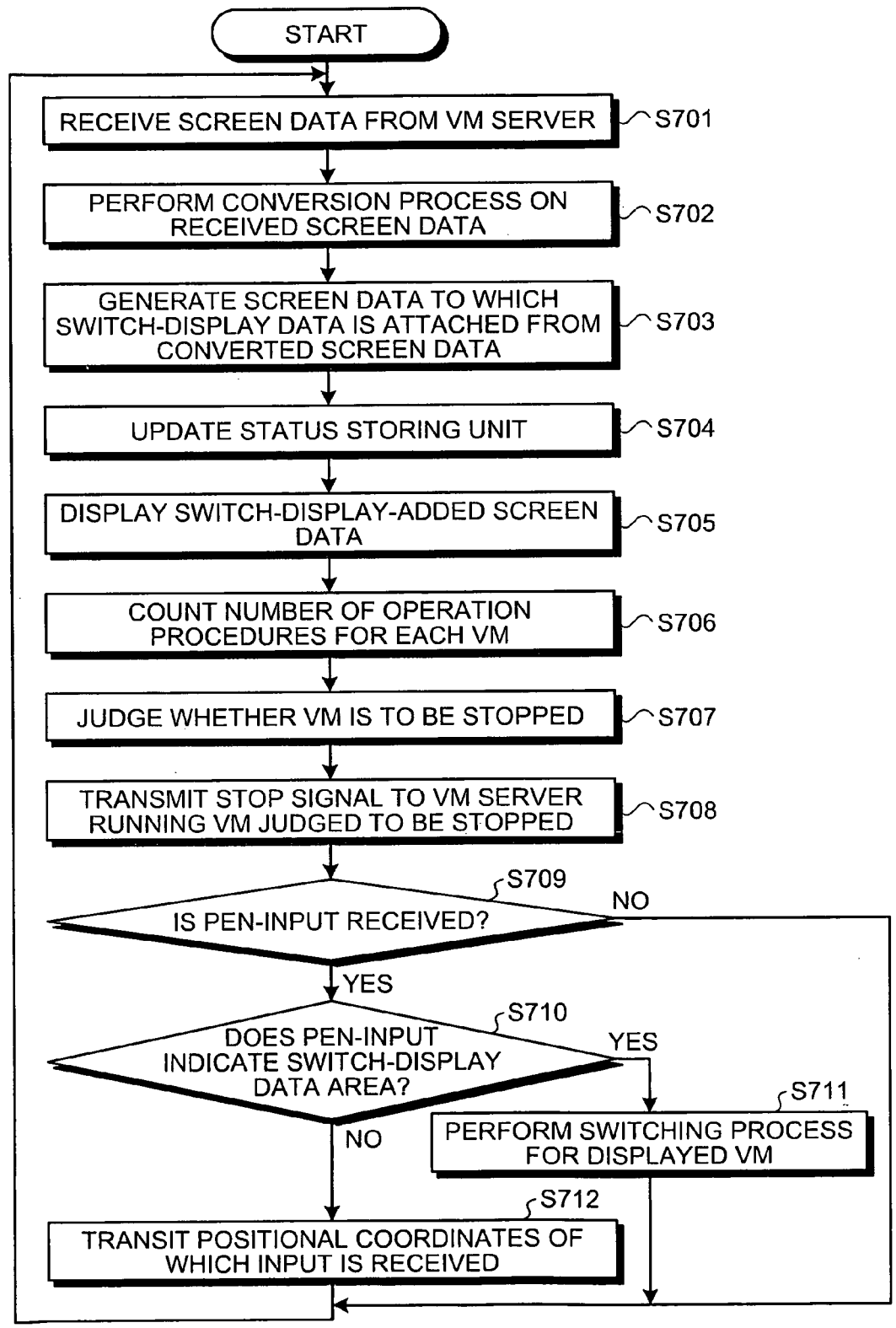
FIG. 7 is a flowchart of an overall process performed by the user monitor terminal according to the first embodiment.

Next, the process performed by the user monitor terminal 100 will be described with reference to FIG. 7.

First, the reception processing unit 211 receives the screen data provided by the VM from the VM server (Step S701).

Next, the image converting unit 203 converts the received screen data to a format that can be displayed by the user monitor terminal 100 (Step S702).

Then, the GUI generating unit 221 generates the switch-display-added screen data by adding the switch-display data to the converted screen data (Step S703).

Next, the GUI controlling unit 204 updates the "display state" fields of the status storing unit 201 based on the switch-display-added screen data to be displayed (Step S704).

Then, the display unit 205 performs a display process on the generated switch-display-added screen data (Step S705).

Next, the operation count counting unit 208 refers to the "display state" field of each entry stored in the status storing unit 201 and counts the number of operation procedures required for a process to be performed from the switch-display-added screen data for each VM (Step S706).

Next, the judging unit 207 judges whether the VM has the switch-display-added screen data to which the switch-display-added screen data currently being displayed can be switched by a single click, from the number of operation procedures for each VM counted by the operation count counting unit 208. Based on judgment results, the judging unit 207 judges whether each VM is to be placed in the stopped state (Step S707).

Then, the transmission processing unit 212 transmits the signal to the VM server running the VM for stopping the VM judged to be placed in the stopped state (Step S708).

Next, the pen-input receiving unit 206 judges whether a pen-input is received (Step S709). When the pen-input receiving unit 206 judges that the pen-input has not been received (No at Step S709), no particular process is performed.

When the pen-input receiving unit 206 judges that the pen-input has been received (Yes at Step S709), the GUI judging unit 222 judges whether the position coordinates of the received pen-input indicate an area of the switch-display data through which the instruction to switch the VM is received (Step S710).

When the GUI judging unit 222 judges that the positional coordinates indicate the area of the switch-display data (Yes at Step S710), the GUI judging unit 222 switches the VM being displayed (Step S711). According to the first embodiment, when the positional coordinates of the received pen-input indicate an area in which the "forward" button is displayed, the GUI judging unit 222 performs a process for switching the VM to the VM associated with "forward" in the status storing unit 201. When the positional coordinates indicate an area in which the "back" button is displayed, the GUI judging unit 222 performs a process for switching the VM to the VM associated with "back" in the status storing unit 201.

On the other hand, when the GUI judging unit 222 judges that the positional coordinates do not indicate an area of the switch-display data (No at Step S710), the transmission processing unit 212 transmits the positional coordinates of the received pen-input to the VM server running the VM (Step S712). Then, the process is repeated again from Step S701.

In the user monitor terminal 100 according to the first embodiment, instructions to stop or suspend each VM can be automatically controlled based on the number of operation procedures required from the screen data currently displayed until the screen data provided by another VM is displayed. As a result, both the operational load placed on the user and the processing load placed on the VM server can be reduced.

In the user monitor terminal 100 according to the first embodiment, because the signal for stopping the VM can be transmitted to the VM in conjunction with the screen data reflecting a usage state of the user, the state of the VM can be appropriately controlled.

Moreover, in the user monitor terminal 100, because the state of the VM is automatically switched, the user is not required to judge which VM is to be stopped or suspended. Therefore, the user is not required to have special knowledge of the VM and the like. Usage is facilitated.

Conventionally, clear judgment for placing the VM in the active state, the stopped state, and the suspended state has been difficult to make. However, in the user monitor terminal 100 according to the embodiment, because an instruction to switch the state of the VM is given in conjunction with the screen data reflecting the usage state of the user, the state of the VM can be appropriately controlled.

According to the first embodiment, an example in which the GUI method is the "page switching method" is described. According to a second embodiment, an example in which a "tab method" is used as the GUI method will be described.

Figure 8:
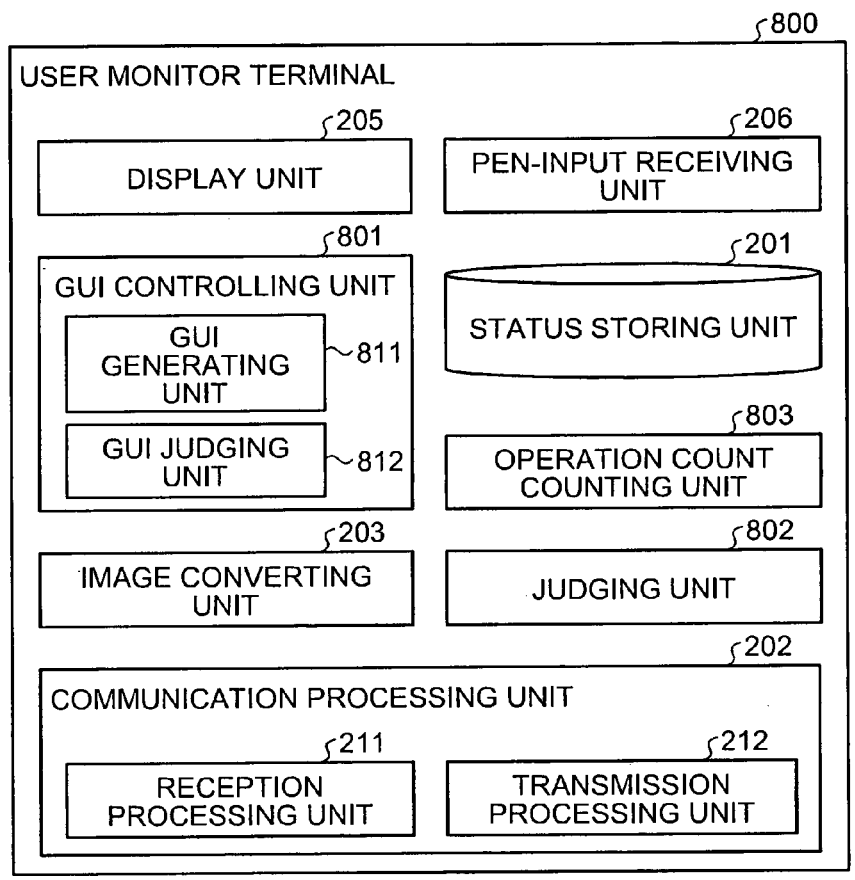
FIG. 8 is a block diagram of a configuration of a user monitor terminal according to a second embodiment.

As shown in FIG. 8, a user monitor terminal 800 according to the second embodiment differs from the above-described user monitor terminal 100 according to the first embodiment in that the user monitor terminal 800 includes a GUI controlling unit 801 performing a process differing from that of the GUI controlling unit 204, a judging unit 802 performing a process differing from that of the judging unit 207, and an operation count counting unit 803 performing a process differing from that of the operation count counting unit 208. Explanations of configurations and processes of the user monitor terminal 800 according to the second embodiment that are the same as those of the user monitor terminal 100 according to the first embodiment are not repeated.

The GUI controlling unit 801 includes a GUI generating unit 811 and a GUI judging unit 812. The GUI controlling unit 801 controls switch-display data used to switch the VM. The GUI controlling unit 801 also updates the status storing unit 201.

The GUI generating unit 811 generates the switch-display data. The GUI generating unit 811 also generates switch-display-added screen data by combining the generated switch-display data and inputted screen data. The switch-display data according to the second embodiment is a tab used to switch the screen data for each VM. When a pen-input is performed on the tab, the screen data displayed in the display unit 205 is switched. In this way, according to the second embodiment, the "tab method" is used as the GUI method used for the switch-display data.

Figure 9:
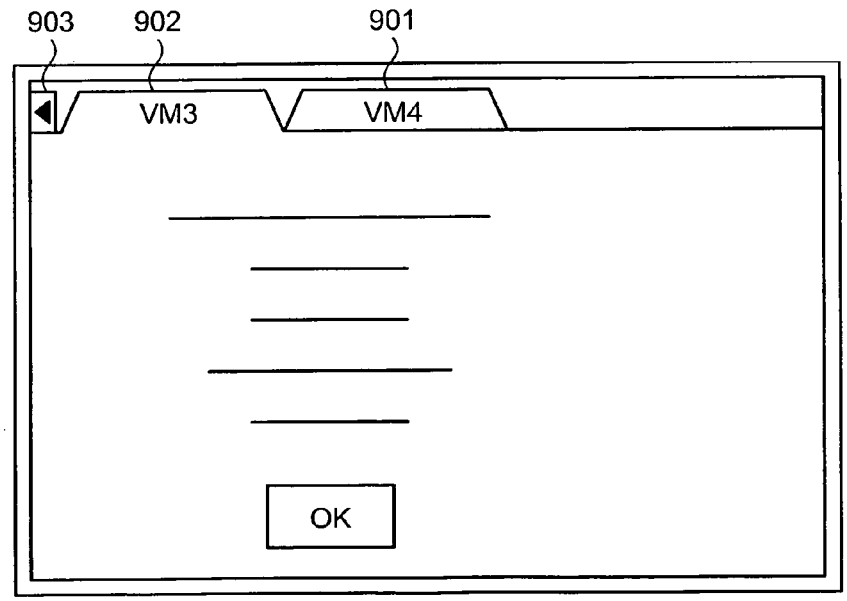
FIG. 9 is a diagram of a first example of a screen displayed in a display unit of the user monitor terminal according to the second embodiment.

In a screen example in FIG. 9, a tab 902 of the VM 3 currently being displayed, a tab 901 of the VM 4, and an arrow button 903 used to display a hidden tab are displayed. A tab of the VM 2 is moved further leftward from a left-side end of a screen as a result of a user operation and is, therefore, hidden. The tab itself of the VM 2 is not displayed. A tab of the VM 1 has already been deleted by the user. In this way, the user can display and not display the tab, delete the tab, change a position of the tab, and the like.

Because the tab 902 is currently selected, the display unit 205 displays the screen data of the VM 3. When the user clicks the tab 901 with the pen, the display unit 205 displays the screen data provided from the VM 4.

Figures 10, 11:
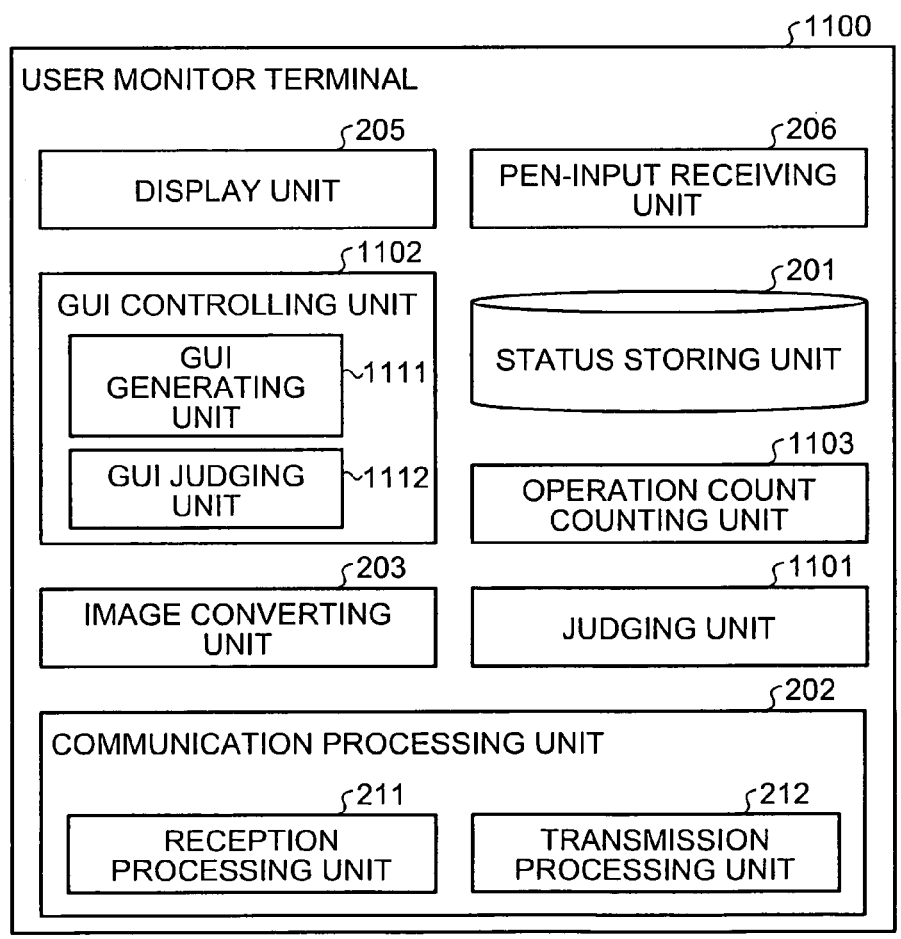
FIG. 10 is a diagram of a table structure of a status storing unit according to the second embodiment.
FIG. 11 is a block diagram of a configuration of a user monitor terminal according to a third embodiment.

Then, the GUI controlling unit 801 updates the "display state" fields of the status storing unit 201 as shown in FIG. 10. First, the status storing unit 201 is in a following state. The entry for the VM 1 of which the tab has been deleted is deleted. Entries for the other VM (VM2 to VM 4) are registered.

The "display state" field is set to three settings: "tab hidden", "displaying", and "tab displayed". "Tab hidden" indicates a state in which the tab is hidden. "Displaying" indicates a state in which the tab and the screen data provided by the VM are displayed. "Tab displayed" indicates a state in which only the tab is displayed.

The GUI judging unit 812 judges whether positional coordinates indicated by pen-input information received by the pen-input receiving unit 206 indicate the tab for switching the VM. When the GUI judging unit 812 judges that the positional coordinates indicate the tab, the GUI judging unit 812 judges that the VM is to be switched to the VM of the tab. When the GUI judging unit 812 judges that the VM is to be switched, the transmission processing unit 212 transmits a notification for switching the VM.

The GUI judging unit 812 also judges whether the positional coordinates indicated by the pen-input information received by the pen-input receiving unit 206 indicate the arrow button 903. When the GUI judging unit 812 judges that the positional coordinates indicate the arrow button 903, the display unit 205 displays the VM 2 hidden on the left side. As a result, the user can indicate the tab of the VM 2.

The operation count counting unit 803 counts the number of operation procedures required to perform a process from the switch-display-added screen data displayed by the display unit 205 for each VM, based on each entry stored in the status storing unit 201. The operation count counting unit 803 according to the second embodiment can count the number of operation procedures required for each VM from the "display state" field of each entry in the status storing unit 201. For example, when the "display state" field is set to "tab displayed", the entry is that of a VM that can perform a process by a single operation. When the "display state" field is set to "tab hidden", the entry is that of a VM that can perform a process by at least two or more operations.

Then, based on the number of operation procedures counted by the operation count counting unit 208 for each VM, the judging unit 802 judges whether each VM is to be stopped.

As a result of the number of operation procedures counted by the operation count counting unit 803 for each VM, regarding the VM providing the screen data currently being displayed and the VM of which the tab is being displayed, the judging unit 802 can judge that the screen data provided by each VM can be displayed by a single click or less. Therefore, the judging unit 802 judges that the VM are placed in the active state. Moreover, regarding the VM of which the tab is hidden, two operations involving selecting the tab after pressing the arrow button 903, are required. Therefore, the judging unit 802 judges that the VM is to be placed in the stopped state.

Moreover, the judging unit 802 judges that the VM whose entry for the "display state" field is set to "displaying" or "tab displayed" is to be placed in a active state, and updates the "status" field of the entry to "active". The judging unit 802 judges that the VM of an entry whose "display state" field set to "tab hidden" is to be placed in a stopped state, and updates the "status field" of the entries to "stopped". When the entry is deleted, the judging unit 802 judges that the VM of the deleted entry is in the suspended state.

The user monitor terminal 800 according to the embodiment can achieve effects similar to those achieved according to the first embodiment. In addition, the service provided by the VM can be switched as required by the user.

According to the above-described embodiments, examples of when the "page switching method" and the "tab method" are used as the GUI method are described. According to a third embodiment, an example in which a "multi-window method" is used as the GUI method is described.

As shown in FIG. 11, a user monitor terminal 1100 according to the third embodiment differs from the above-described user monitor terminal 100 according to the first embodiment in that the user monitor terminal 1100 includes a GUI controlling unit 1102 performing a process differing from that of the GUI controlling unit 204, a judging unit 1101 performing a process differing from that of the judging unit 207, and an operation count counting unit 1103 performing a process differing from that of the operation count counting unit 208. Explanations of configurations and processes of the user monitor terminal 1100 according to the third embodiment that are the same as those of the user monitor terminal 100 according to the first embodiment are not repeated.

The GUI controlling unit 1102 includes a GUI generating unit 1111 and a GUI judging unit 1112,. The GUI controlling unit 1102 controls screen data of each VM and icons indicating VM. The GUI controlling unit 1102 also updates the status storing unit 201.

The GUI generating unit 1111 generates a window displaying the screen data of each VM or an icon indicating a VM. The GUI generating unit 1111 also generates screen data in which the window and the icon are disposed within a display area.

In a screen example shown in FIG. 12, a window 1201 and a window 1203 are displayed. The window 1201 displays screen data of the VM 3 that is currently running. The window 1203 displays screen data of the VM 2. Between the window 1201 and the window 1203, focus is placed on the window 1201 of the VM 3. Therefore, the VM 3 can receive user operations. Because a window 1202 of the VM 4 is behind the window 1201 of the VM 3, the window 1202 is not displayed on the screen. Although the window 1203 of the VM 2 is displayed on the screen, focus is not placed on the window 1203. Moreover, an icon of a window of the VM 1 is created by user operation as indicated by a reference number 1204.

According to the third embodiment, whether a window of a VM is displayed is more important than where the focus is placed. In other words, although the focus is not placed on the window 1203 of the VM 2, the window 1203 becomes a search subject by a single user operation. Therefore, the VM 2 is required to be placed in an active state. The window 1202 of the VM 4 is behind the window 1201 of the VM 3. Therefore, because the user cannot visually recognize the window 1202 and cannot call the window 1202 of the VM 4 with a single operation, the VM 4 is in a waiting state.

Moreover, the icon 1204 of the VM 1 is considered to have been created as declaration that the user will not be using the VM 1 for a while. In other words, the window of the VM 1 can be called by a single operation through use of the icon 1204 of the VM 1. However, because the user intentionally places the VM1 in a waiting state, it is considered more appropriate for the VM 1 to transition to the suspended state rather than the active state. Therefore, according to the third embodiment, a VM of which an icon is created (such as the VM 1) is placed in the suspended state.

Then, based on a display state of the window of each VM shown in FIG. 12, the GUI controlling unit 1102 updates the "display state" fields in the status storing unit 201 as shown in FIG. 13.

A "display state" field according to the third embodiment can be set to four states: "icon-created", "displaying", "displaying (focused)", and "not displayed". The "icon-created" state indicates that the user has created an icon of the VM under premise that the screen data provided by the VM will not used. The "displaying" state indicates that, although focus is not placed on the VM, the window of the VM is displayed. The "displaying (focused)" state indicates that focus is placed on the window, and the window of the VM is displayed. The "not displayed" state indicates that the window of the VM is positioned behind a window of another VM and is not displayed.

The GUI judging unit 1112 judges whether the positional coordinates in pen-input information received by the pen-input receiving unit 206 indicate the window or the icon of the VM. When the GUI judging unit 1112 judges that the positional coordinates indicate the window, the GUI judging unit 1112 judges that focus is placed on the window. When the GUI judging unit 1112 judges that the positional coordinates indicate the icon, the GUI judging unit 1112 judges that the window of the VM of the icon is required to be displayed, and focus is required to be placed on the displayed window. The GUI judging unit 1112 also judges whether a window positioned behind an arbitrary window is indicated, through application of a currently used technology or the like. When the window behind the window is indicated, the GUI judging unit 1112 disposes the window in the front and places focus on the window.

Based on each entry stored in the status storing unit 201, the operation count counting unit 1103 counts the number of operation procedures required for a process to be performed from the switch-display-added screen data displayed in the display unit 205 for each VM. The operation count counting unit 1103 according to the third embodiment can count the number of operation procedures for each VM from the "display state" field of each entry in the status storing unit 201.

For example, when the "display state" field is set to "displaying", the entry is that of a VM that can perform a process by a single operation. When the "display state" field is set to "not displayed", the entry is that of a VM that can perform the process by at least two or more operations. When the "display state" field is set to "icon-created", the entry is that of a VM that can perform a process by a single operation. However, creation of the icon for the VM indicates that the user requires the use of the VM to be stopped. Therefore, as an exceptional process, the operation count counting unit 1103 instructs the judging unit 1101 to place the VM of the entry in the suspended state when the "display state" field is set to "icon-created".

Then, based on the number of operation procedures counted by the operation count counting unit 208 for each VM, the judging unit 1101 judges whether to stop each VM. When the operation count counting unit 208 instructs the judging unit 1101 to place the VM in the suspended state, the judging unit 1101 judges that the VM is to be placed in the suspended state.

In other words, in the user monitor terminal 1100 according to the third embodiment, regarding the VM of which the window is displayed, the judging unit 1101 judges that the VM is to be placed in the activated state because the window can be displayed with a single click, regardless of where focus is placed. Moreover, regarding the VM hidden behind another window, the judging unit 1101 judges that the VM is to be placed in the stopped state because other operations in addition to the single click are required. Moreover, regarding the VM of which the icon is created, the judging unit 1101 judges that the VM is to be placed in the suspended state because the user is not expected to use the VM for a while.

In other words, regarding the VM of an entry of which the "display state" field is set to "displaying" or "displaying (focused)", the judging unit 1101 judges that the VM is placed in the active state. The transmission processing unit 212 transmits a signal for placing the VM in the active state to the VM server running the VM as required. The judging unit 1101 also updates the "status" field of the entry to "active".

Regarding the VM of an entry of which the "display state" field is set to "not displayed", the judging unit 1101 judges that the VM is placed in the stopped state. The transmission processing unit 212 transmits a signal to the VM server running the VM for placing the VM in the stopped state. The judging unit 1101 also updates the "status" field of the entry to "stopped".

Moreover, regarding the VM of an entry of which the "display state" field is set to "icon-formed" or the VM of a deleted entry, the judging unit 1101 judges that the VM is placed in the suspended state. The transmission processing unit 212 transmits a signal to the VM server running the VM for placing the VM in the suspended state. When the "display state" field is set to the "icon-formed", the judging unit 1101 updates the "status" field of the entry to "suspended".

The user monitor terminal 1100 according to the third embodiment can achieve the same effects as those according to the second embodiment. Moreover, the active state and the stopped state of the VM can be appropriately switched even when a plurality of VM are used in parallel.

According to the above-described first to third embodiments, examples in which the "page switching method", the "tab method", and the "multi-window method" are used as the GUI method are described. However, other GUI methods can also be used.

As shown in FIG. 14, the user monitor terminal 100, the user monitor terminal 800, and the user monitor terminal 1100 have a hardware configuration including a read-only memory (ROM) 1402, a CPU 1401, a random access memory (RAM) 1403, a communication interface (I/F) 1404, a display device 1405, a detecting device 1406, and a bus 1407. The ROM 1402 stores therein a communication processing program and the like used to perform the above-described processes. The CPU 1401 controls each unit of the user monitor terminal 100, the user monitor terminal 800, and the user monitor terminal 1100 according to the program in the ROM 1402. The RAM 1403 is a data storage area. The communication I/F 1404 performs communication by connecting to a network. The display device 1405 displays the screen data. The detecting device 1406 detects an instruction entered using a pen device. The bus 1407 connects each section.

The communication processing program can be provided by being recorded on a non-transitory recording medium readable by a computer, such as a compact disc read-only memory (CD-ROM), a flexible disk (FD), a digital versatile disk (DVD), and the like in an installable file format or an executable file format.

In this case, the communication processing program can be loaded into the RAM 1403 in the user monitor terminal 100, the user monitor terminal 800, and the user monitor terminal 1100, by being read from the recording medium and executed. Each of the above-described sections in the hardware configuration can be generated on the RAM 1403.

The communication processing program according to the above-described embodiments can be stored on a computer connected to a network, such as the Internet. The communication processing program can be provided by being downloaded over the network.

Although the present invention is described according to the embodiments, configurations according to the above-described embodiments can be combined. Various modifications and improvements can be made to the embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication device comprising:
   a receiving unit that receives, from one or more computers each running at least one virtual machine that can be switched between an active state and a stopped state, screen information provided by a plurality of virtual machines;
   a display unit that displays first screen information provided by at least a first virtual machine included in the plurality of virtual machines;
   a judging unit that judges whether a second virtual machine performing a process is to be stopped, the process being accessible by inputs to an interface of the communication device, the judging being based on the number of inputs required to display second screen information provided by the second virtual machine, the second virtual machine being included in the plurality of virtual machines; and
   a transmitting unit that transmits a signal to the computer running the second virtual machine judged to be stopped for stopping the second virtual machine 2. The device according to claim 1, further comprising:
   an input counting unit that counts the number of inputs required to display the second screen information from the displayed first screen information, wherein
   the judging unit judges whether the second virtual machine is to be stopped based on the counted number of inputs.

3. The device according to claim 1, wherein the judging unit judges to stop the second virtual machine if the second virtual machine cannot perform the process from the displayed first screen information by a single input.

4. The device according to claim 1, wherein
the display unit further displays switch-display information for switching the first virtual machine with the first screen information, and
the communication device further includes an input receiving unit that receives as a single input, input of a coordinate area in which the switch-display information is displayed.

5. The device according to claim 4, wherein the switch-display information displayed by the display unit instructs switching to the second virtual machine before and after the first screen information currently displayed.

6. The device according to claim 4, wherein the switch-display information displayed by the display unit instructs switching to the second virtual machine which provides the second screen information differing from the first screen information currently displayed.

7. The device according to claim 1, wherein displayed screen information of each virtual machine is in a window format.

8. The device according to claim 7, wherein, when the second screen information is present behind another piece of the first screen information, the judging unit judges whether the second virtual machine performing a process is to be stopped because the second virtual machine requires a plurality of inputs for the process to be performed.

9. The device according to claim 1, wherein the display unit displays one or more virtual machines as wait-display information indicating a waiting state within the screen information, and
regarding the virtual machines displayed as the wait-display information by the display unit, the judging unit judges that the virtual machines are to be stopped regardless of the number of inputs required to access corresponding processes.

10. A communication method comprising:
receiving, from one or more computers each running at least one virtual machine that can be switched between an active state and a stopped state, screen information provided by a plurality of virtual machines;
displaying first screen information provided by at least a first virtual machine included in the plurality of virtual machines;
judging whether a second virtual machine performing a process is to be stopped, the process being accessible by inputs to an interface, the judging being based on the number of inputs required to display second screen information provided by the second virtual machine, the second virtual machine being included in the plurality of virtual machines; and
transmitting a signal to the computer running the second virtual machine judged to be stopped for stopping the second virtual machine.

11. The method according to claim 10, further comprising:
counting the number of inputs required to display the second screen information from the displayed first screen information, wherein
the judging includes judging whether the second virtual machine is to be stopped based on the counted number of inputs.

12. The method according to claim 10, wherein
the judging includes judging to stop the second virtual machine if the second virtual machine cannot perform the process from the displayed first screen information by a single input.

13. The method according to claim 10, wherein
the displaying further includes displaying switch-display information for switching the first virtual machine with the first screen information, and
the method further includes receiving as a single input, input of a coordinate area in which the switch-display information is displayed.

14. The method according to claim 10, wherein displayed screen information of each virtual machine is in a window format.

15. The method according to claim 14, wherein, the judging includes, when the second screen information is present behind another piece of the first screen information, judging whether the second virtual machine performing a process is to be stopped because the second virtual machine requires a plurality of inputs for the process to be performed.

16. The method according to claim 10, wherein
the displaying of screen information includes displaying one or more virtual machines as wait-display information indicating a waiting state within the screen information, and
the judging includes, regarding the virtual machines displayed as the wait-display information, judging that the virtual machines are to be stopped regardless of the number of inputs required to access corresponding processes.

17. A computer program product having a non-transitory computer readable medium including program instructions for communication, wherein the instructions, when executed by a computer, cause the computer to perform operations comprising:
receiving, from one or more computers each running at least one virtual machine that can be switched between an active state and a stopped state, screen information provided by a plurality of virtual machines;
displaying first screen information provided by at least a first virtual machine included in the plurality of virtual machines;
judging whether a second virtual machine performing a process is to be stopped, the process being accessible by inputs to an interface, the judging being based on the number of inputs required to display second screen information provided by the second virtual machine, the second virtual machine being included in the plurality of virtual machines; and
transmitting a signal to the computer running the second virtual machine judged to be stopped for stopping the second virtual machine 18. The computer program product according to claim 17, wherein the instructions, when executed by the computer, cause the computer to further perform operations comprising:
counting the number of inputs required to display the second screen information from the displayed first screen information, wherein
the judging includes judging whether the second virtual machine is to be stopped based on the counted number of inputs.

19. The computer program product according to claim 17, wherein
the judging includes judging to stop the second virtual machine if the second virtual machine cannot perform the process from the displayed first screen information by a single input.

20. The computer program product according to claim 17,
the displaying of screen information further includes displaying switch-display information for switching the first virtual machine with the first screen information, and the instructions, when executed by the computer, cause the computer to further perform operations comprising receiving as a single input, input of a coordinate area in which the switch-display information is displayed.

* * * * *